Patented Nov. 6, 1928.

1,690,916

UNITED STATES PATENT OFFICE.

SIGURD WESTBERG, OF PITTSBURGH, PENNSYLVANIA.

METHOD OF REDUCING OXIDES TO METALLIC FORM.

No Drawing.   Application filed July 16, 1925. Serial No. 44,109.

This invention relates to the reduction of oxides or oxide ores to metallic form and is of special value in the production of metals or alloys of metals that tend to form carbides at the temperature of reduction.

In an application for U. S. Letters Patent filed by me and serially numbered 40,092, I have disclosed an improved method of reducing oxides or oxide ores to metallic form in which carbonaceous material is used as the reduction material and in which carbon monoxide gas is generated during reduction.

An object of this invention is to provide a method for utilizing the carbon monoxide gas generated during reduction, for the reduction proper in connection with the carbonaceous reduction material in such a manner that a saving in reduction material, a better control of the reduction processes proper, (specially as to the carbon content of the product), a higher velocity or a lower reduction temperature or both and a better recovery is obtained.

This, as well as other objects which will readily appear to those skilled in this particular art, I attain by means of the method and the several steps thereof described in the specification and specifically pointed out in the appended claims.

In carrying out this invention, I convert part of the carbon monoxide gas leaving the reduction furnace or the reduction system wholly or partly into hydrogen gas and introduce this hydrogen gas or gas mixture into the same furnace or into another furnace in which the reduction process is carried out with a carbonaceous reduction material or carbonaceous fuel.

The hydrogen gas is derived from the carbon monoxide gas in the gas mixture leaving the furnace by a contact process (any one of the well known contact processes may be utilized) by leading the carbon monoxide gas or gas mixture from the reduction furnace or system into a contact apparatus together with steam whereby the following reaction takes place:—

$$CO + H_2O \longleftrightarrow CO_2 + H_2$$

The carbon dioxide is then removed preferably by absorption in water under pressure. In some cases, it is found desirable to further purify the hydrogen gas or the mixture of hydrogen gas and carbon monoxide in order to remove the carbon dioxide, water vapor, sulphuretted hydrogen, phosphorated hydrogen and nitrogen. For this purpose any of the well known apparatus or methods may be utilized. It will be apparent that the hydrogen gas may also be made from the carbon monoxide gas according to other methods as for instance by having the gas reduce iron oxide to iron and then steam the reduced iron whereby hydrogen is liberated; this is then introduced into the reduction system.

The hydrogen gas or gas mixture is preferably introduced into the hottest part of the furnace, that is into the reaction zone or the gas or gas mixture may be introduced into the shaft or preparation part of the furnace system, especially where iron ores are to be reduced.

The advantage of introducing hydrogen gas or hydrogenous mixture in the shaft or low temperature part of the furnace especially when iron ore is to be reduced, is that it will lower or depress the partial pressure of the carbon monoxide gas and will thereby prevent this gas from decomposing and depositing carbon on the metal or ore which would be detrimental to the operation of the process and the material according to the following equation:—

$$2CO \longleftrightarrow C + CO_2$$

Due to the advantageous equilibrium of the $H_2$ to $H_2O$ at high temperatures, the hydrogen gas can be used for reduction purposes where the carbon monoxide gas could not perform any reduction.

The hydrogen gas according to this invention can be conveniently and cheaply made from the waste carbon monoxide gas derived from the reduction. In addition to the hydrogen produced by converting the carbon monoxide gas from the reduction proper the hydrogen gas thus produced can be admixed with hydrogen gas or hydrogenous gas from an extraneous source.

This invention is not only advantageous in the making of steel and low carbon products, but also in the making of pig iron and other high carbon products.

This invention is of special value in connection with the direct production of iron and low carbon steels and ferro alloys as it will materially cheapen the manufacture of the same.

Having thus described my invention, what I claim is:—

1. The method of reducing oxides or oxide ores to metallic form which consists in bringing together such oxides or ores and carbonaceous material in the presence of sufficient heat to effect a reaction therebetween and in converting the carbon monoxide formed during such reaction into hydrogen or a hydrogenous gas and in introducing such gas or hydrogen into the reaction zone.

2. The method of reducing oxides or oxide ores to metallic form which consists in bringing together such oxides or ores and carbonaceous material in the presence of sufficient heat to effect a reaction therebetween, in converting the carbon monoxide resulting from such reaction into hydrogenous gas, in purifying such gas and then in introducing the purified gas into the reaction zone.

In testimony whereof, I have hereunto subscribed my name this 11th day of July, 1925.

SIGURD WESTBERG.